June 11, 1946.  R. L. LEVY  2,402,115
HYDRAULIC BRAKING SYSTEM FOR VEHICLES
Filed April 27, 1942  3 Sheets-Sheet 1
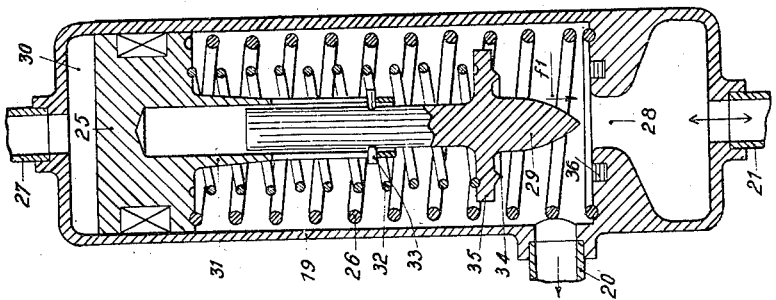
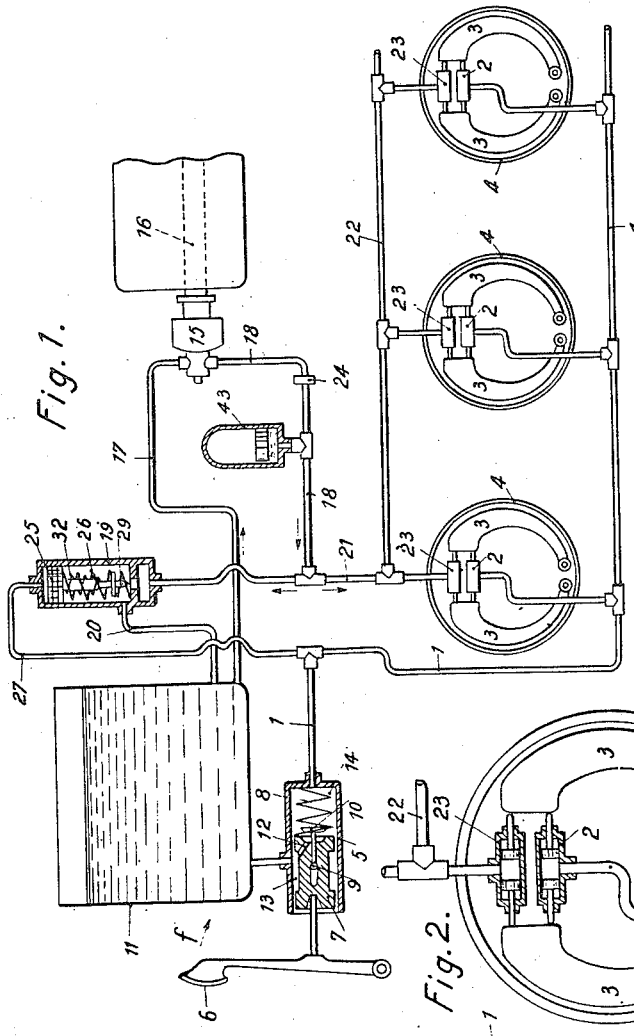
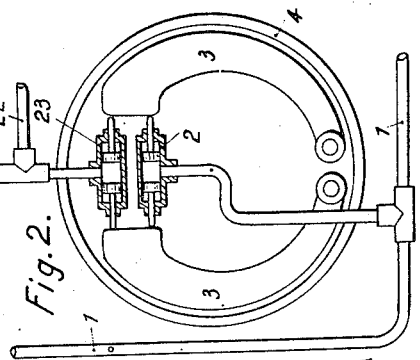
Inventor
R. L. Levy June 11, 1946.  R. L. LEVY  2,402,115
HYDRAULIC BRAKING SYSTEM FOR VEHICLES
Filed April 27, 1942  3 Sheets-Sheet 3

Inventor
R. L. Levy
By Glascock Downing & Seebohm
Attys.

Patented June 11, 1946

2,402,115

UNITED STATES PATENT OFFICE 2,402,115

HYDRAULIC BRAKING SYSTEM FOR VEHICLES

René Lucien Levy, Paris, France, assignor to Societe d'Inventions Aeronautiques et Mecaniques S. I. A. M., Fribourg, Switzerland Application April 27, 1942, Serial No. 440,671
In France December 14, 1940

10 Claims. (Cl. 188—152)

It is well known that there exist various types of hydraulic brakes for vehicles, which, utilising accumlated energy in the form of compressed fluid contained in a reservoir under pressure, afford an efficient braking.

These brakes present may well-known advantages, notably, an excellent output, absence of universal couplings, ease of assembly, and great progressivity. Unfortunately they possess the disadvantage of taking from the motor of the vehicle a certain amount of its power.

There exist also other types of brakes which work mechanically and obtain the effects of self operating brakes by utilising the energy of the moving mass, during only the act of braking, i. e., without employing any of the tractive effort.

The present invention has for its object the combination of these two types of brakes. In the present invention I employ first and second braking means, and hydraulic pressure applying means operatively connected to the first braking means. A pedal or the like, actuated by the operator, causes the pressure applying means to be exerted against the first braking means. I also employ a pump driven by a wheel or traction part of the vehicle and continuously operated while the vehicle is travelling but stationary when the vehicle stops, and a passageway connects the pump with the second braking means. A liquid reservoir is used in the system and a second passageway connects the reservoir and the pump for supplying liquid to the latter. A third passageway connects the first passageway with the reservoir for returning liquid from the pump to the latter, and in combination with such elements, I use hydraulically operated means interposed in the third passageway and controlled by said pedal or the like for preventing liquid from flowing from the pump to the reservoir so that liquid from the pump, through the medium of the first passageway, will exert pressure on the second braking means.

The attached drawings show embodiments of a combined system of braking possessing the above characteristics.

On the drawings:

Fig. 1 is a diagrammatic representation of the braking system, partly in vertical section.

Fig. 2 shows, on a larger scale, a pair of brake cylinders on a device to be braked, such as a wheel.

Fig. 3 shows the regulator in diametrical and vertical section.

Figure 4:
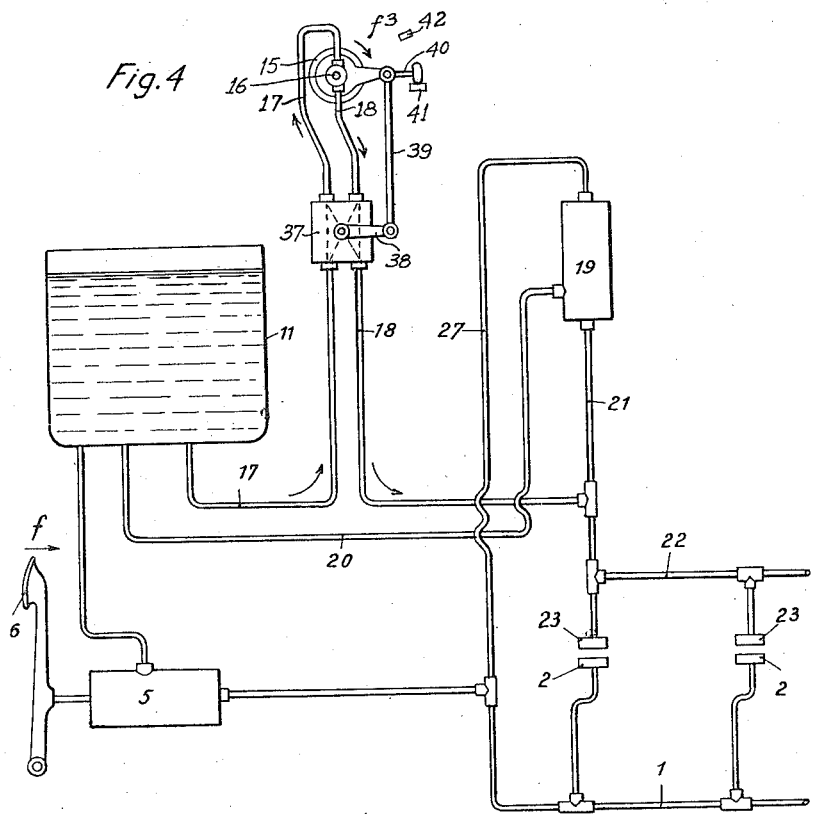
Fig. 4 shows diagrammatically the control of the inversion of the braking, for braking when driving forwards or backwards.

In reference to Figs. 1 to 3:

The circuit of direct control, which causes the braking by a simple transmission of the driver's effort, assures, by a main piping, the feeding of a series of receiving cylinders 2, of suitable type, operating the braking shoes 3 which act, for instance, on the brake drums 4, mounted on the wheels of the vehicle to be braked.

This first circuit 1 is dependent on a transmitting apparatus 5 controlled by the driver by means of a pedal 6, or the equivalent. This pedal causes the displacement of a piston 7, subjected to the action of an opposing spring 8.

The transmitting apparatus 5 may be of any convenient type, for example in conformity with that forming the object of French Patent No. 820,739 filed July 24, 1936, by the Sté d'Inventions Aeronautiques et Mécaniques S. I. A. M.

A pin 9, rigid with 5, serves as a top for the stem of a valve 10 which, when the apparatus is at rest, is open, and permits free communication between a liquid reservoir 11 and the circuit 1 by the intermediary of a passage 12 in piston 7, and leading, on one hand, to an annular space 13 of the piston, and on the other, to the anterior compartment 14 of the apparatus 5.

When the driver pushes pedal 6 in the direction of arrow f, the valve 10 closes, and the liquid contained in compartment 14 of the direct circuit 1, is forced into the series of cylinders 2.

The servo-circuit has, as generator of pressure, a pump 15 of large output, mounted on a motor shaft 16 which receives a part of the kinetic energy of the vehicle to be braked, this shaft 16 being, for example, connected to the wheels of the vehicle in a positive manner.

Pump 15 draws the liquid from the reservoir 11 by pipe 17 and forces this liquid back into the reservoir by pipe 18 in passing through a regulator 19 Fig. 3, the liquid going back to the reservoir by pipe 20.

On the servo-circuit 18, 19, 20 is branched a pipe 21—22 which supplies a second series of brake cylinders 23, cooperating with cylinders 2 for the application of the shoes on the brake drums.

Downstream of pump 15 and upstream of regulator 19 are mounted a small accumulator 43, called a buffer-accumulator, and a one-way valve 24.

The regulator (Fig. 3) is constituted fundamentally by a cylinder 19 inside of which there is a solid piston 25 subjected to the action of an antagonistic spring 26.

Cylinder 19 communicates on one hand with a branch 27 from the circuit of direct command 1, and on the other with the tubes 21 and 20 of the servo-circuit.

The cylinder 19 has an orifice 28 which is normally sufficient to let pass the output of pump 15, from the pipe 21 to the pipe 20, with an insignificant loss in pressure.

The section which this orifice offers to the passage of the liquid from pipe 21 to pipe 20 may be more or less throttled by the action of a needle 29 of which the distance of entry, according to arrow $f^1$, depends on the pressure existing on the upper face of piston 25, in the compartment 30 of cylinder 19.

The needle 29 may slide in a guide 31 on piston 25 and is under the action of the coil spring 32 which tends to return it to low position.

The displacement of this needle in the direction of arrow $f^1$ is limited by a pin 33 which meets the lower extremity of guide 31.

The operation of this system is as follows:

When the vehicle is under way, pump 15 actuated by the kinetic energy of the vehicle, is by-passed back to the reservoir, orifice 28 of the regulator being of such size that, even at the greatest speeds, the pressure which may result from the passage of the liquid through this orifice cannot cause the opening of the braking-shoes under the action of cylinders 23, depending on the servo-circuit 18—21—22.

To stop the vehicle, the driver, as indicated before, presses on pedal 6 so that valve 10, closing on piston 7, the reservoir 11 is cut out from direct circuit 1, and a certain amount of liquid from compartment 14 is forced into the series of cylinders 2 by direct circuit 1, which causes the braking to begin.

Further, the pressure thus generated in circuit 1 re-acts by pipe 27 in compartment 30 on piston 25 of the regulator, so that needle 29 begins to descend in the regulating orifice 28, which increases the loss of pressure in circuit 18. There results, in this circuit, an over-pressure which, acting in the group of brake cylinders 23, causes a powerful braking by the brake-shoes 3 on drums 4.

The opening of these shoes determines a reduction in the pressure of direct circuit 1 so that the driver, by operating pedal 6, should accompany the movement of the shoes in order that the braking is maintained, this braking increasing as the driver increases his pressure on the pedal 6.

At the same time the progressive descent of needle 29, which tends to increase the braking, is accompanied by a diminution in the output of pump 15 in consequence of the progressive slowing of the vehicle by the braking action.

The vehicle is finally stopped, and, in these conditions the driver can maintain it immovable without any effort notwithstanding that the pump 15 has ceased to flow fluid into the circuit 18—22.

Indeed, from this moment, a circular seat 34, provided on a disc 35, solid with needle 29, reposes on a packing 36, surrounding orifice 28, so that the liquid of servo circuit is held, on one hand by this packing, and on the other by the one-way valve 24.

The little buffer accumulator 43 contributes, then, by the energy which it has stored, to assure the permanence of this braking.

It should be remarked that if the driver, for any reason, lessens his action on pedal 6, the effect of the braking disappears instantly in the series of cylinders 23, since seat 34 leaves the packing 36. Nevertheless the vehicle is maintained immovable by the sole action of the direct command circuit 1 which does not communicate with servo-circuit 18—22. The direct brake then acts in complete independence of the servo-brake which is brought to rest.

The spring 32 which tends constantly to push down the needle in the direction $f^1$ compensates for the diminution of the pressure resulting from the progressive reduction of speed of rotation of the pump 15 in proportion to the action of braking.

This needle 29 may, however, be subjected to certain trembling hydraulic shocks. To eliminate them the disc 35, affixed to the needle, may be constructed so that it will slide on the inner surface of cylinder 19 and act as a dash-pot in connection with the liquid in which this disc is immersed.

This combined system of braking may also be rendered efficient for the braking of the vehicle when going backwards (Fig. 4).

To realize the braking, regardless of the direction of movement of the vehicle, there is mounted between tubes 17 and 18, issuing from the pump 15, an inversion valve 37 of appropriate type, which is apt to substitute the connection in parallel (represented on Fig. 4 by dots) for the cross-connection (hyphen and dots) and vice versa.

The control of this inversion valve is effected by lever 38 hinged on another link 39, pivoted to an arm 40, rigid with the casing of pump 15, and able to oscillate between two stops 41—42 which form the abutments for the pump.

It will be assumed that the pump is of a type, such as the gear pump, in which the inversion of the direction of rotation causes the inversion of the output.

The disposition represented on Figs. 1–4 corresponds to the clock-wise direction of rotation for pump 15, (arrow $f^3$), when an observer looks at the pump in front of the transmission shaft 16.

When the shaft 16 is operated in reverse direction, by reason of the backward movement of the vehicle, the pump swings under the entraining effort of shaft 16, so that arm 40, previously engaging stop 41 is moved towards stop 42; thus bringing into action the connection valve 37 and ensuring inversion of circuits 17 and 18.

Figure 5:
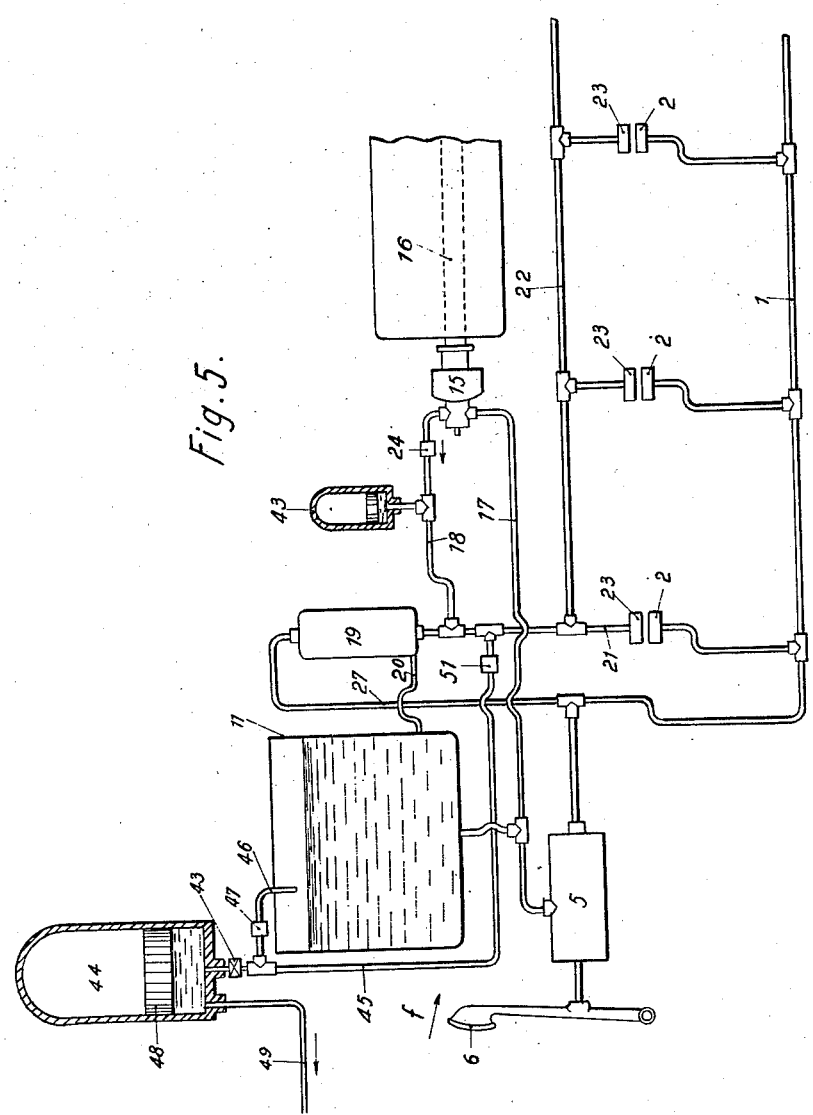
Fig. 5 shows the system of braking, with its appendages, for the accumulation of energy with a view to assuring operation of certain parts on the vehicle.

Fig. 5 shows an embodiment of the combined system of braking, with a view of assuring the taking of pressure to feed, outside the action of braking, certain other services on the vehicle.

This eventual utilisation of energy supplied by pump 15 and taken from the kinetic energy of the vehicle, allows the limitation, to a suitable value, the pressure supplied by the pump in servo-circuit 21—22.

In effect, the pump, of which one can foresee the utilisation for the case under consideration, is capable of developing ordinarily pressures superior to 100 kg/cm.². It is therefore reasonable to limit, for instance, to 60 kg/cm.² the pressure which will be sent into servo-circuit 22, it being presumed that this pressure corresponds to the pressure limit above which the wheels of the vehicle would be stopped.

Seeing that it is therefore advisable to interpose on the servo circuit 18—21—22 a discharging valve 51 it is possible to utilise the liquid which is evacuated by this valve to fill a complementary accumulator 44, distinct to assure other services.

The pipe 45 connecting this valve to the said accumulator, has, in proximity of the reservoir a branch pipe 46 on which is mounted a tared valve 47, fixed, for example, at 35 kg/cm.² Consequently the portion of the pipe 45, between valves 43 and 47, cannot be subjected to a pressure above 35 kg/cm.²

Accumulator 44—furnished with a piston 48, and of which the initial filling will be such that the pressure towards the circuit 49 of the services may, for instance, equal 20 kg/cm.² when the piston 48 begins to rise—will offer then, for the execution of these services, a volume of liquid under a pressure sufficiently large if this accumulator is of very large dimensions. The pressure thus available will fluctuate between 20 and 35 kg/cm.² and will constitute a source of energy capable of feeding, for instance, a self energized steering, distant opening of doors, or anything else.

On considering again Fig. 1 the direct command circuit 1 could be, in certain cases, insufficient to assure the feeding of a somewhat important number of cylinders of group 2.

It would be well, therefore to distribute suitably the brake cylinders, corresponding to each of these two groups, according to the necessities of the braking.

Figure 6:
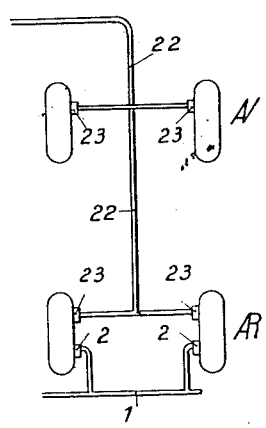
Figs. 6 and 7 show, diagrammatically, two variations for the realization of the system.

For instance, according to Figure 6, only the rear wheels of the vehicle are furnished with twin cylinders 2—23 served by the two circuits respectively 1 and 22, and the front wheels carry only cylinders 23 fed from the servo-circuit 22.

Figure 7:
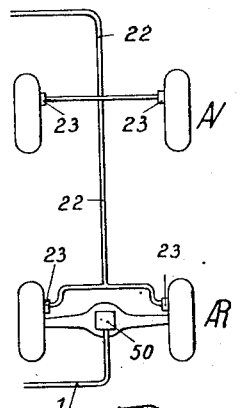

Figure 7 shows diagrammatically the realization of such a variation of the combined system of braking.

The front and back wheels are each provided with a cylinder 23 fed from servo-circuit 22, while the brake is dependent on a special cylinder 50, which receives its energy from direct circuit 1; all other arrangements may be adopted according to working conditions without departing from the spirit of the invention.

What I claim as my invention and desire to secure by Letters Patent is:

1. A hydraulic braking system for vehicles comprising a first braking circuit adapted to be actuated solely by the effort of the operator, and a second braking circuit comprising a liquid reservoir, a pump adapted to be driven by the vehicle, a passageway for conducting liquid from the reservoir to the pump, a second passageway for conducting the pumped liquid, means for connecting selectively the first passageway with one or the other of the intake and discharge orifices of the pump and the second passageway with the other one of these orifices, a first branch connected to the second passageway for returning pumped liquid to the reservoir, and a second branch connected to the second passageway and adapted to lead pumped liquid to the braking means.

2. A hydraulic braking system as claimed in claim 1 in which the inversion of the part of the pumps' orifices is controlled in accordance with the direction of movement of the vehicle.

3. A braking apparatus for vehicles comprising first and second braking means, hydraulic pressure applying means operatively connected to the first braking means, an element adapted to be actuated by an operator for causing the pressure applying means to be exerted against the first braking means, a pump driven from a traction part of the vehicle and continuously operated while the vehicle is traveling but stationary when the vehicle stops, a passageway operatively connecting the pump with the second braking means, a liquid reservoir, a second passageway connecting the reservoir and pump for supplying liquid to the pump, a third passageway connecting the first passageway with the reservoir for returning liquid from the pump to the reservoir, and hydraulically operated means interposed in the third passageway and controlled by said element for preventing liquid from flowing from the pump to the reservoir whereby the liquid from the pump through the medium of the first passageway will exert pressure on the second braking means.

4. A braking apparatus for vehicles comprising first and second braking means, hydraulic pressure applying means operatively connected to the first braking means, an element adapted to be actuated by the operator for causing the pressure applying means to exert pressure on the first braking means, a pump driven from a traction part of the vehicle and continuously operated while the vehicle is traveling but stationary when the vehicle stops, a first passageway operatively connecting the pump with the second braking means, a liquid reservoir, a second passageway connecting the reservoir and pump for conducting liquid from the reservoir to the pump, a third passageway connecting the first passageway with the reservoir for returning liquid from the pump to the reservoir, and hydraulically operated means interposed in the third passageway and controlled by said element for preventing liquid from flowing from the pump to the reservoir, whereby liquid from the pump is caused to exert pressure on the second braking means.

5. A braking apparatus as claimed in claim 4 in which a one-way valve is interposed in the first passageway to prevent liquid therein from flowing toward the pump.

6. A braking apparatus as claimed in claim 4 in which a pressure accumulator is interposed in the first passageway.

7. A braking apparatus as claimed in claim 4 in which the means interposed in the third passageway comprises a cylinder, a valve seat in the cylinder, a piston in the cylinder, a valve operatively connected to the piston and engageable with the seat, and means for normally holding the valve out of contact with said seat.

8. A braking apparatus as claimed in claim 4 including a reversing valve associated with certain of the passageways for causing the fluid to flow reversely through these passageways, and means operatively connecting the valve to the pump whereby the valve is actuated each time the pump is driven forwardly or reversely.

9. A braking apparatus as claimed in claim 4 in which one of the braking means is associated with one wheel of a motor vehicle and the other braking means is associated with another wheel of the motor vehicle.

10. A braking apparatus as claimed in claim 4 in which one of the braking means is connected to an axle of a motor vehicle.

RENÉ LUCIEN LEVY.